United States Patent [19]

Chalupsky

[11] 4,018,473

[45] Apr. 19, 1977

[54] MATERIAL HANDLING EQUIPMENT OPERATOR'S CAB MOUNTING

[75] Inventor: Paul A. Chalupsky, Cedar Rapids, Iowa

[73] Assignee: FMC Corporation, San Jose, Calif.

[22] Filed: Dec. 9, 1974

[21] Appl. No.: 530,773

[52] U.S. Cl. .................... 296/28 C; 180/69 R; 182/63; 182/141
[51] Int. Cl.² ......................................... B62D 27/00
[58] Field of Search ............... 296/28 C; 180/77 S, 180/89 R; 182/63, 141, 2; 56/328 R

[56] References Cited

UNITED STATES PATENTS

| | | | |
|---|---|---|---|
| 2,647,022 | 7/1953 | Smid et al. | 182/63 |
| 2,815,250 | 12/1957 | Thornton-Trump | 182/2 |
| 2,953,229 | 9/1960 | Wiegel | 56/328 R X |
| 3,075,604 | 1/1963 | Barenyi | 180/89 R |
| 3,127,725 | 4/1964 | Richardson | 56/328 R |
| 3,720,047 | 3/1973 | van der Lely | 180/77 S |
| 3,721,077 | 3/1973 | van der Lely | 180/89 R |
| 3,734,223 | 5/1973 | Anderson | 180/89 R |
| 3,891,055 | 6/1975 | Medlock | 182/141 |
| 3,891,264 | 6/1975 | Hunter | 296/28 C |

Primary Examiner—Robert J. Spar
Assistant Examiner—Winston H. Douglas
Attorney, Agent, or Firm—J. F. Verhoeven; J. W. Edwards; C. E. Tripp

[57] ABSTRACT

A heavy duty truck carrier has a machinery platform mounted thereon for rotation in a generally horizontal plane about a substantially vertical axis. Material handling equipment, such as a crane or an excavator, is mounted upon the machinery platform in a position over the vertical axis of rotation. An operator's cab is offset from the axis of rotation and mounted upon an elevating mechanism attached to the machinery platform. The elevating mechanism has a pair of hydraulic cylinders mounted within a support frame and actuating arms extending upward from the cylinders and frame to support a bracket attached to the upper portion of the operator's cab. A pair of guide brackets project from the lower portion of the operator's cab and are slidably mounted for vertical movement about the outside surfaces of the hydraulic cylinders. Thus, the cab can be elevated to provide the operator with an unobstructed view of the work during operation or lowered for overhead clearance when the carrier is transporting the material handling equipment.

3 Claims, 7 Drawing Figures

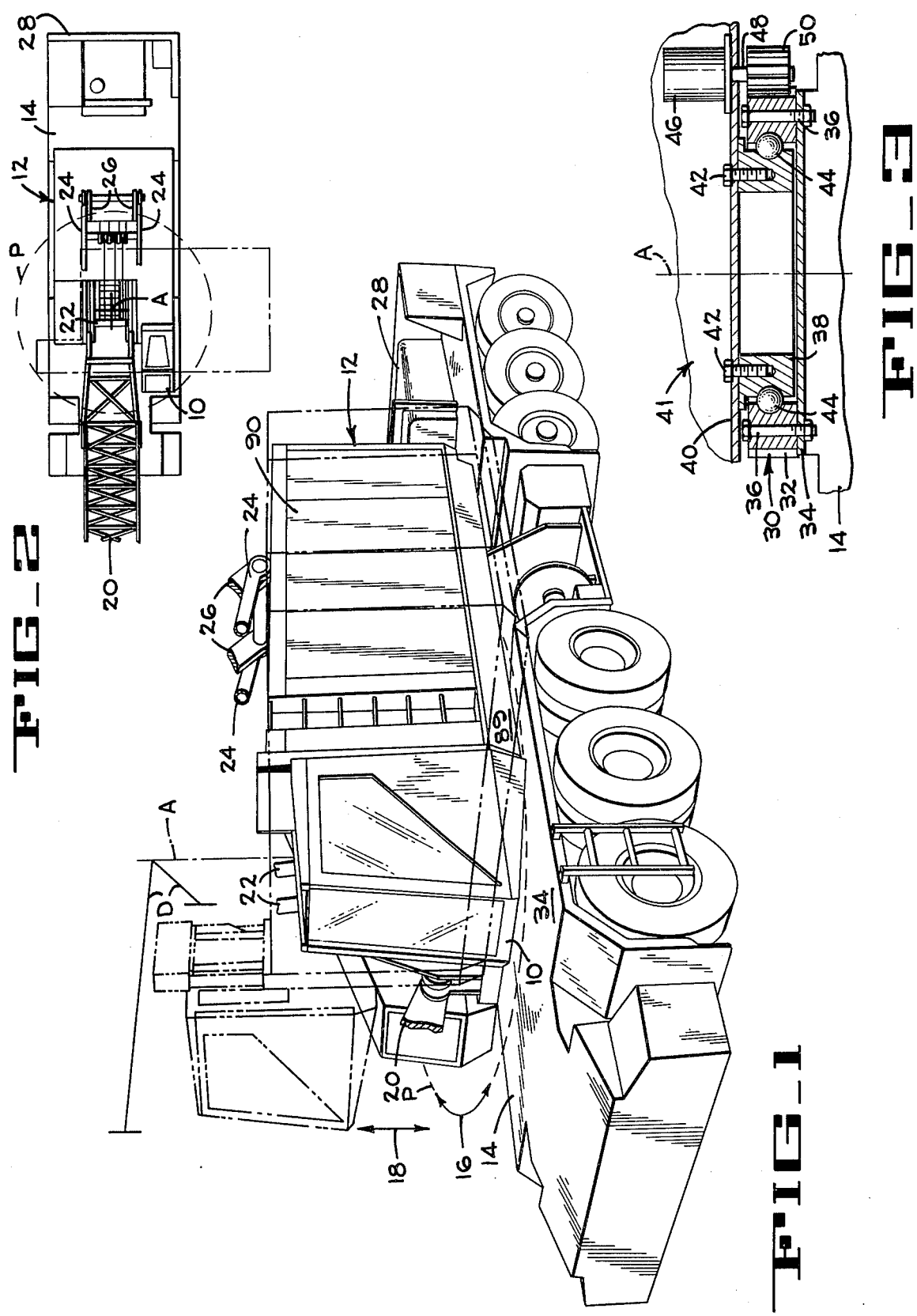

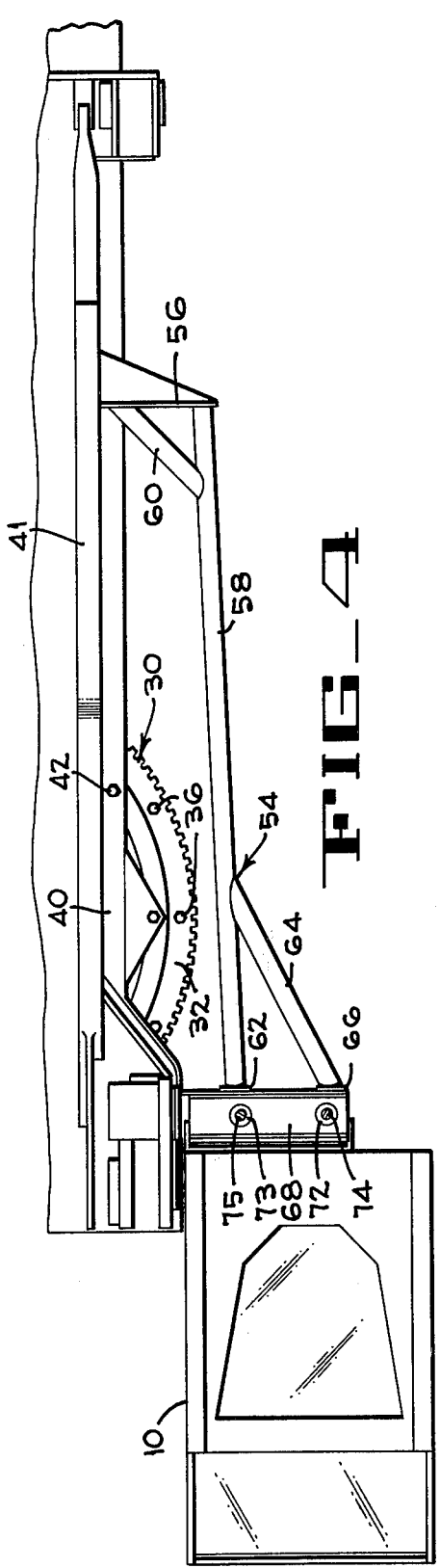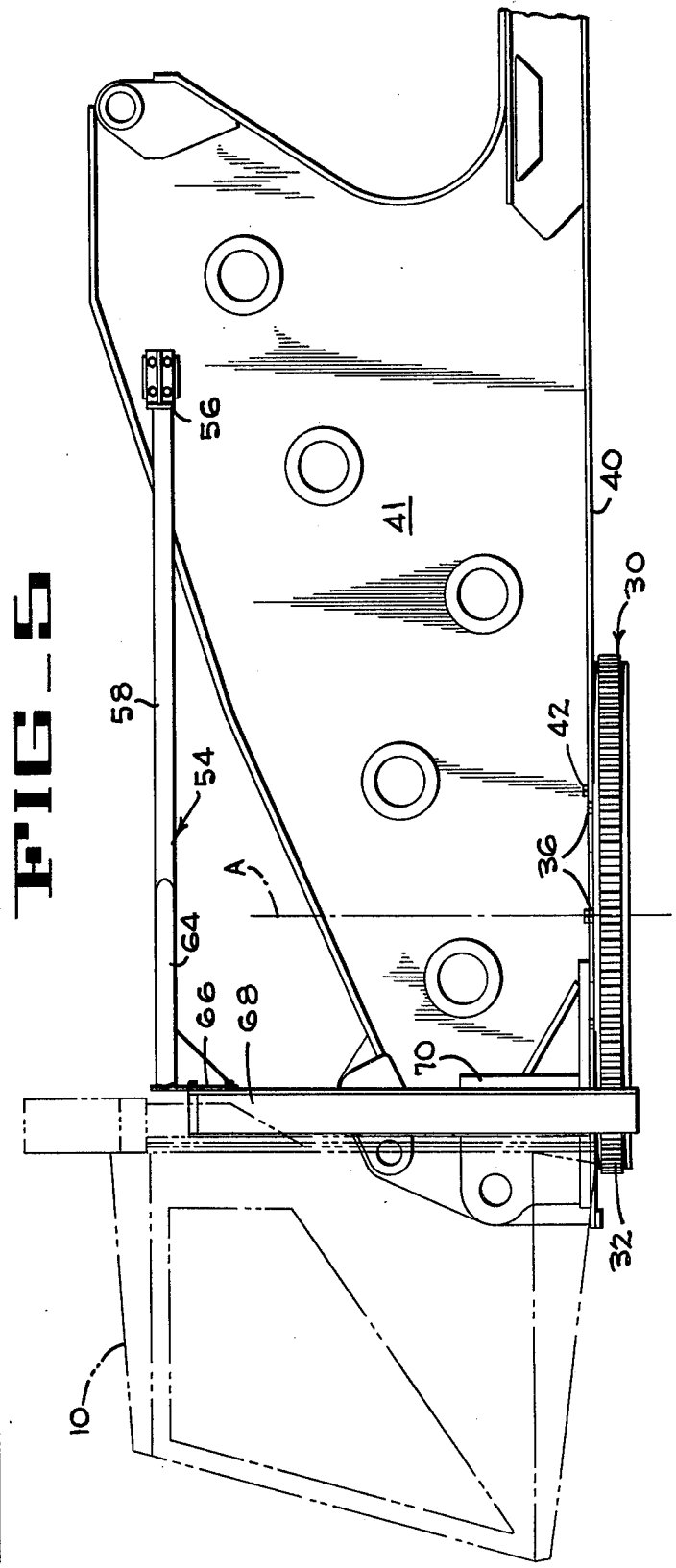

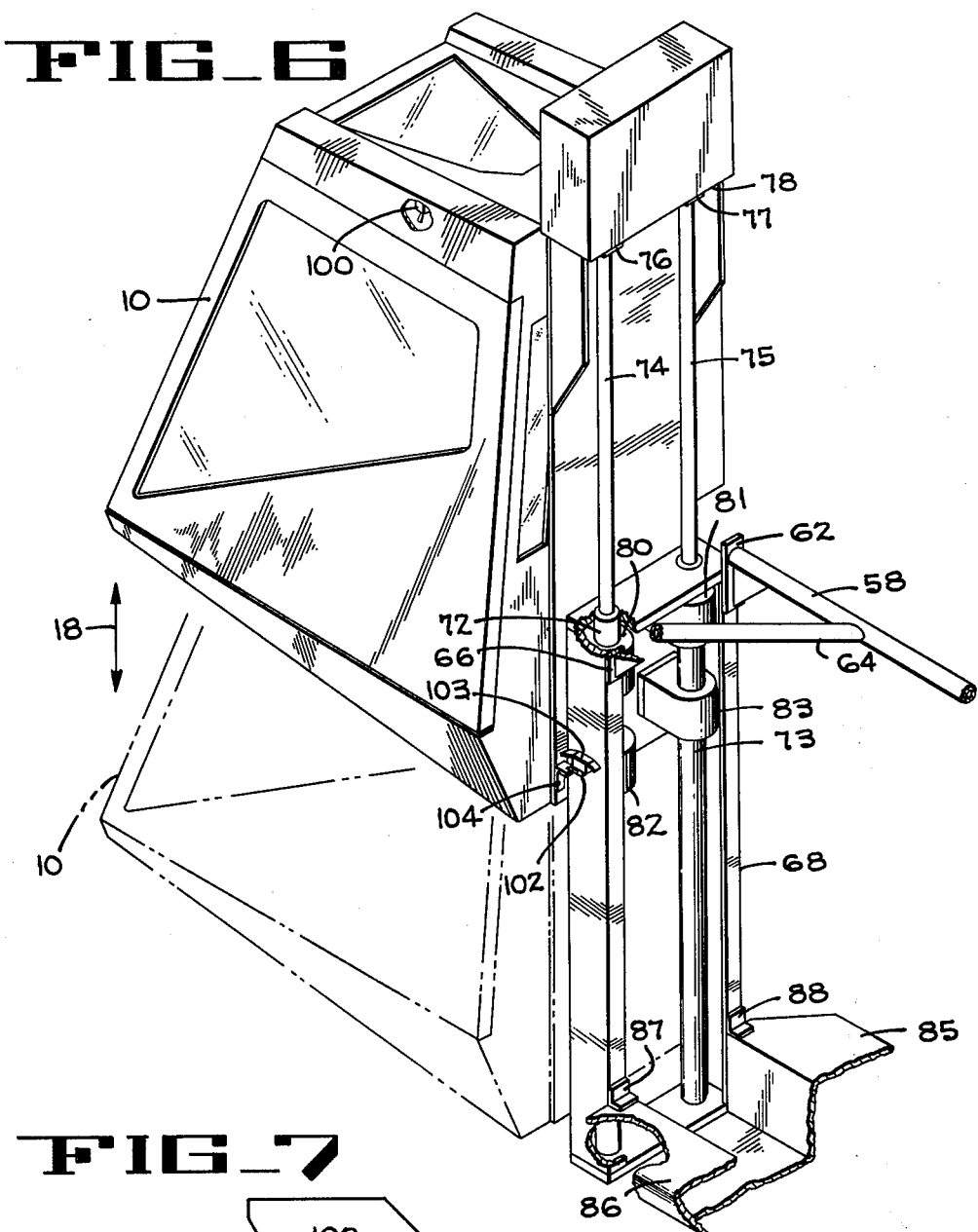
FIG_6
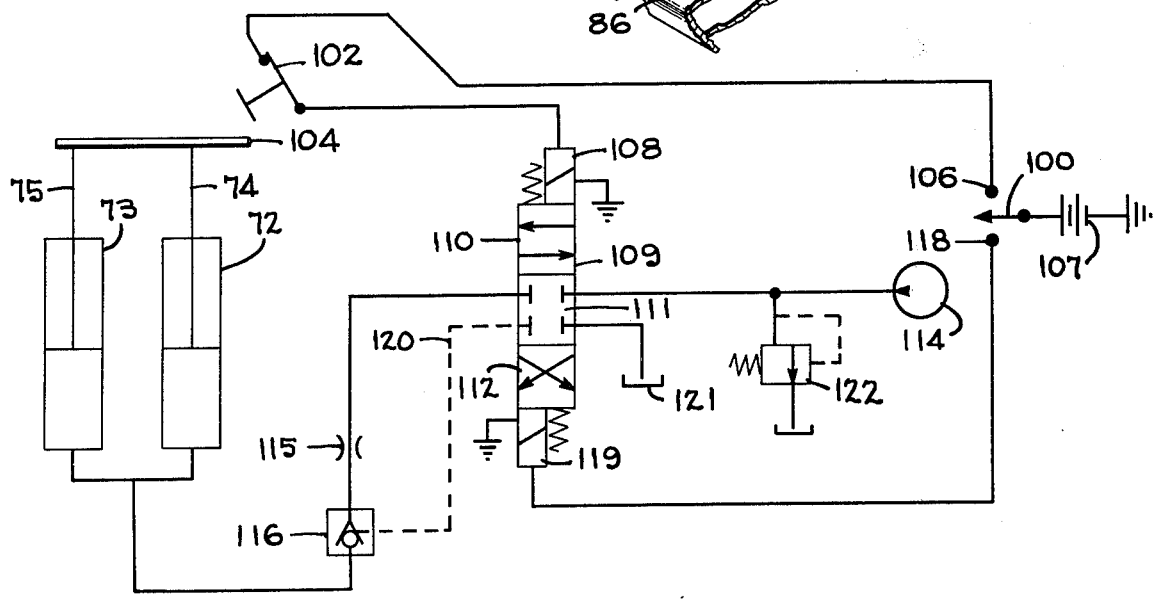
FIG_7

MATERIAL HANDLING EQUIPMENT OPERATOR'S CAB MOUNTING

BACKGROUND OF THE INVENTION

1. Field of the Invention

This invention relates to carrier mounted, material handling equipment, such as cranes and excavators, and more specifically, it pertains to an operator's cab mounting on such equipment.

2. Description of the Prior Art

United States Pat. No. 2,529,200 discloses a material handling machine with an operator's cab mounted upon a front corner of a machinery platform that rotates in a generally horizontal plane. The cab is fixed in a stationary position on the platform, relative to an adjacent machinery enclosure, and extends to a higher level than the enclosure to provide an unobstructed view in all directions for the operator. Specialized loading operations often require an operator to sit at an elevated vantage point in order to have an unrestricted view of the work he is performing or else have a spotter to act as a second pair of eyes and to give signals as to what the operator should do. Such operations include loading or unloading material within a railroad gondola car and loading or unloading material upon an elevated pile, such as logs stacked high on a truck.

U.S. Pat. Nos. 3,431,016 and 3,630,398 disclose elevated cabs that can be pivoted about a horizontal axis to reduce the profile of a vehicle for travel clearance requirements. U.S. Pat. No. 3,545,633 discloses an elevated cab that can be collapsed for highway travel to avoid interference with bridges and other overhead obstructions. Thus, while it is desirable to have an elevated cab on material handling equipment that provides the operator with an unobstructed view for operation of the equipment, it is also necessary to maintain the equipment profile within limits for clearance when traveling.

An operator's cab for carrier mounted cranes and excavators is normally mounted upon a machinery platform that rotates in a generally horizontal plane about a substantially vertical axis. The cab is offset to one side from the vertical axis of rotation because a lifting boom and its associated machinery are normally located thereon but the cab does face toward the forward end of the boom and turns therewith to various work positions so that the operator faces the work. Thus, the cab is mounted for one degree of movement relative to the carrier but there remains the need to have the cab elevated for visibility during operation and lowered for clearance when traveling. When the cab is mounted in a stationary elevated position, the operator must climb a high ladder or adjacent structure to gain access to the cab. Such stationary structure makes it difficult to find access to adjacent machinery for repairs.

SUMMARY OF THE INVENTION

An operator's cab for carrier mounted material handling equipment, such as cranes and excavators, is mounted for two degrees of movement relative to the carrier. The cab swings in a generally horizontal plane about a substantially vertical axis at a distance offset from the axis and either simultaneously or independently moves vertically between a lowered transport position and various elevated positions where the operator has unobstructed visibility of the work. The operator can enter and leave the cab by way of the carrier when the cab is in the lowered position and the cab serves as an elevator for carrying the operator to and from the elevated positions. Access to machinery located adjacent to the cab can be provided by elevating the cab.

In a preferred form of the invention, a machinery platform is mounted upon a carrier for rotation in a generally horizontal plane about a substantially vertical axis. An elevating mechanism is attached to the machinery platform at a location offset from the axis of rotation of the platform. An operator's cab is supported by the elevating mechanism for vertical movement between a transport position and various elevated positions where the operator has unobstructed visibility. The elevating mechanism has a pair of hydraulic cylinders mounted within a support frame and actuating arms extending upward from the hydraulic cylinders and frame to support a bracket attached to the upper portion of the operator's cab. A pair of guide brackets project from the lower portion of the operator's cab and are slidably mounted for vertical movement about the outside surfaces of the hydraulic cylinders.

BRIEF DESCRIPTION OF THE DRAWINGS

FIG. 1 is a perspective view of a carrier mounted crane having an operator's cab mounting embodying the present invention. The cab, shown in solid line, is lowered for clearance during transport, while the cab, indicated in phantom line, is in an operating position rotated in a horizontal plane to face perpendicular to the carrier and elevated for unobstructed visibility.

FIG. 2 is a diagrammatic plan view of the carrier mounted crane shown in FIG. 1.

FIG. 3 is a fragmentary section in elevation illustrating the turntable bearing by which the machinery platform is mounted for rotation in a horizontal plane upon the carrier.

FIG. 4 is a fragmentary plan illustrating the operator's cab mounting support assembly that is attached to the revolving frame.

FIG. 5 is a side elevation view of the operator's cab mounting support assembly with the cab shown in phantom line.

FIG. 6 is a perspective view of the operator's cab mounting and elevating mechanism, the lowered cab position being indicated in phantom line.

FIG. 7 is a schematic illustration of the hydraulic and electrical circuitry for elevating the operator's cab.

DESCRIPTION OF THE PREFERRED EMBODIMENT

With reference to FIG. 1, an operator's cab 10, for material handling equipment 12, is mounted for 2° of movement relative to a carrier 14. The cab swings, as indicated by the double arrow 16, in a generally horizontal plane P about a substantially vertical axis A at a distance D offset from the axis and moves vertically, as indicated by the double arrow 18, between a lowered transport position, shown in solid line facing longitudinally of the carrier and an elevated position, shown in phantom line facing perpendicular to the carrier, where the operator has unobstructed visibility of the work. Horizontal rotation of the cab and material handling equipment between the position longitudinal of the carrier and the position perpendicular thereto, as indicated in FIG. 1, is more clearly shown in FIG. 2. FIG. 1 illustrates the 2° of cab movement and such movement of the cab in either degree can be performed simultaneously or independently of cab movement in the other degree.

The material handling equipment 12 can be either a crane or excavator. To simplify the drawing and more clearly show the operator's cab 10 in both a lowered and an elevated position, a boom 20, a live mast 22, boom stops 24 and anchors 26 have been broken away. The carrier 14 shown is a heavy duty truck type vehicle having a front end 28 but it should be understood that any heavy duty carrier, whether it be crawler, barge, rail or truck type, can be used to transport the material handling equipment. The material handling equipment is mounted upon the carrier for rotation in a horizontal plane about the vertical axis A by a turntable bearing 30, shown in FIG. 3.

The turntable bearing 30 has a ring gear 32 that is centered about the vertical axis A and fastened to a deck plate 34 of the carrier 14 by bolts 36. A rotatable ring 38 fits concentrically within the ring gear and is secured to a base 40 of a revolving frame 41 by screws 42. The inner face of the ring gear and the outer face of the rotatable ring are grooved to define a ball race that receives ball bearings 44. Thus, the rotatable ring can rotate with minimal friction within the ring gear. A reversible motor 46 is mounted upon the revolving frame and has a drive shaft 48 that extends through the frame base to support a pinion 50 in mesh with the ring gear. When the motor is driven in either direction, the pinion moves about the ring gear and the revolving frame turns accordingly about the vertical axis A.

Looking now at FIGS. 4 and 5, the revolving frame 41 is shown without such machinery as the engine, hoist drums, and clutches attached thereto so a cylinder mount support assembly 54 can be more clearly seen. This assembly includes a mounting bracket 56 that is bolted to the revolving frame for supporting one end of a tubular support 58. A diagonal brace 60 extends between the tubular support and the mounting bracket to provide lateral support between these members. The opposite end of the tubular support has a mounting bracket 62 attached thereto and a diagonal brace 64, extending outwardly from the tubular support, has a mounting bracket 66 attached thereto. The mounting brackets 62 and 66 are fixed to the top of a support frame 68. One side of the support frame is attached near the bottom to a boom connector panel 70 that is mounted on the revolving frame.

With reference to FIG. 6, a pair of hydraulic cylinders 72 and 73 are mounted within the support frame 68 and have actuating arms 74 and 75, respectively, that extend upwardly therefrom. Vibration isolators 76 and 77 are positioned between the uppermost ends of the actuating arms and a support bracket 78 that is attached to the upper rear portion of the operator's cab 10. Thus, the operator's cab is supported by the actuating arms and hydraulic cylinders for vertical movement as indicated by the double arrow 18. Projecting from the lower rear end of the operator's cab are an upper pair of guide brackets 80 and 81 and spaced downwardly therefrom are a lower pair of guide brackets 82 and 83. These brackets are slidably mounted about the outside surfaces of the hydraulic cylinders to move vertically thereon and guide the lower portion of the operator's cab as it moves up and down.

A platform extension 85, shown in FIG. 6, extends from the revolving frame 41 and an angle member 86 is attached thereto. The support frame 68 is connected by an angle 87 to the angle member 86 and by an angle 88 to the platform extension. The revolving frame, platform extensions and angle member along with somewhat similar extensions on the opposite side of the revolving frame form the upper machinery platform 89, shown in FIG. 1, and a machinery housing 90 is mounted upon the platform.

Looking again at FIG. 6, an operator's toggle switch 100 is located on the interior overhead panel of the operator's cab 10 for controlling the up and down movement of the cab. Also, a limit switch 102 that is covered by a guard 103 can be contacted by an angle 104 projecting from the bottom of the operator's cab to limit upward vertical travel of the cab.

With reference to FIG. 7, when the toggle switch 100 engages contact 106, current flows from a power source 107, through the limit switch 102 to a solenoid 108 that controls a hydraulic control valve 109 having an up position 110, a stop position 111, and a down position 112. Energization of the solenoid causes the control valve to shift to the up position and enables fluid to flow from a fluid power source 114 through the control valve up position, a restrictor 115, and a pilot operated check valve 116 to the hydraulic cylinders 72 and 73. The actuating arms 74 and 75 are elevated until angle 104 contacts the limit switch 102 or else the toggle switch is moved to a neutral or down position. When the limit switch breaks the circuit to the solenoid 108 or when the toggle switch is moved, the solenoid is de-energized and the hydraulic control valve is centered by the springs in the stop position 111.

When the toggle switch 100 is moved to engage contact 118, a solenoid 119 is energized to shift the hydraulic control valve 109 to the down position 112. Fluid from the fluid power source 114 flows through the control valve to the pilot operation line 120 and opens the check valve 116. That enables fluid to return from the hydraulic cylinders 72 and 73 through the check valve, the restrictor 115, and the control valve down position to a reservoir 121. Thus, the actuating arms 74 and 75 will move downward until the operator's cab 10 is in a lowered position or solenoid 119 is de-energized by moving toggle switch 100. A pressure relief valve 122 is provided between the fluid power source and the hydraulic control valve.

It will thus be seen that the operator's cab 10 can swing in a generally horizontal plane P about a substantially vertical axis A at a distance D offset from the axis and either simultaneously or independently move vertically between a lowered transport position and various elevated positions where the operator has unobstructed visibility of the work. Such a movable cab provides for a more effective utilization of space on the carrier 14 and enables better visibility for operation.

Although the best mode contemplated for carrying out the present invention has been herein shown and described, it will be apparent that modification and variation may be made without departing from what is regarded to be the subject matter of the invention.

What is claimed is:

1. In material handling equipment, the combination comprising a carrier, a machinery platform being mounted upon the carrier for rotation in a generally horizontal plane about a substantially vertical axis, an elevating mechanism being attached to the machinery platform at a location offset from the axis of rotation of the platform, and an operator's cab being supported by the elevating mechanism to move vertically between a level where overhead clearance above the cab is provided for transport and various elevated levels thereabove where the operator has unobstructed visibility of the work, said elevating mechanism further including a support frame, a pair of hydraulic cylinders being mounted within the support frame and having actuating arms extending upwardly therefrom, a support bracket being attached to the upper rear portion of the operator's cab and being supported by the actuating arms of the hydraulic cylinders adjacent one side of said support frame, and at least one pair of guide brackets projecting rearwardly from the lower portion of the operator's cab, each guide bracket encircling in a horizontal plane the outside circular surface of a respective one of said hydraulic cylinders to bear laterally against the cylinder surface in response to horizontal forces on the bracket existing between said operator's cab and said cylinder and to slide vertically along the cylinder in response to vertical forces on the bracket.

2. Material handling equipment as described in claim 1 wherein bracing means is secured to said support frame on the other side thereof opposite from the side attached to said operator's cab to resist horizontal forces.

3. In material handling equipment having a carrier, a machinery platform mounted upon the carrier for rotation in a generally horizontal plane about a substantially vertical axis, and an equipment operator's cab supported from the machinery platform at a location that is offset from the axis of rotation of the platform, the improvement comprising a support bracket that projects outwardly from the upper portion of the operator's cab, a pair of hydraulic cylinders that are positioned vertically below the support bracket, a pair of actuating arms that extend vertically from the hydraulic cylinders to the support bracket, means for supporting each hydraulic cylinder at the upper end and the lower end of the cylinder, and at least one pair of guide brackets that project from the lower portion of the operator's cab beneath the support bracket, each guide bracket encircling in a horizontal plane the outside circular surface of a respective one of said hydraulic cylinders to bear laterally against the cylinder in response to horizontal forces on the bracket existing between said operator's cab and said cylinder and to slide vertically along the cylinder in response to vertical forces on the bracket.

* * * * *